(12) United States Patent  
Zacher et al.

(10) Patent No.: US 10,415,568 B2  
(45) Date of Patent: Sep. 17, 2019

(54) ELECTRICAL SPLIT-CAGE OR CANNED COOLANT PUMP

(71) Applicant: PIERBERG PUMP TECHNOLOGY GMBH, Neuss (DE)

(72) Inventors: Wolfgang Zacher, Doebeln (DE); Rene Patzner, Hohenstein-Ernstthal (DE)

(73) Assignee: PIERBURG PUMP TECHNOLOGY GMBH, Neuss (DE)

( * ) Notice: Subject to any disclaimer, the term of this patent is extended or adjusted under 35 U.S.C. 154(b) by 844 days.

(21) Appl. No.: 14/428,372

(22) PCT Filed: Sep. 17, 2012

(86) PCT No.: PCT/EP2012/068219  
§ 371 (c)(1),  
(2) Date: Mar. 16, 2015

(87) PCT Pub. No.: WO2014/040651  
PCT Pub. Date: Mar. 20, 2014

(65) Prior Publication Data  
US 2015/0240820 A1 Aug. 27, 2015

(51) Int. Cl.  
*F04D 13/06* (2006.01)  
*F04D 15/00* (2006.01)  
(Continued)

(52) U.S. Cl.  
CPC ......... *F04D 13/0606* (2013.01); *F04D 13/08* (2013.01); *F04D 15/0094* (2013.01); *H02K 5/128* (2013.01); *H02K 11/215* (2016.01)

(58) Field of Classification Search  
CPC .. F04D 13/0606; F04D 13/08; F04D 15/0094; H02K 5/128; H02K 5/215  
(Continued)

(56) References Cited

U.S. PATENT DOCUMENTS 6,354,162 B1 * 3/2002 Bobay ............... G01D 11/30  
310/68 B  
2006/0057001 A1 3/2006 Chen  
(Continued)

FOREIGN PATENT DOCUMENTS

CN 1941569 A 4/2007  
DE 100 01 047 A1 7/2001  
(Continued)

OTHER PUBLICATIONS

English Translation of JP-4760527 (Masakuni) obtained Feb. 16, 2017.*

*Primary Examiner* — Essama Omgba  
*Assistant Examiner* — Connor J Tremarche  
(74) *Attorney, Agent, or Firm* — Norman B. Thot (57) ABSTRACT

An electric canned coolant pump includes a drive motor comprising a split case provided as a separating can which separates a wet chamber comprising a motor rotor from a dry chamber comprising a motor stator. The separating can comprises a separating can form-fit structure. A Hall sensor is arranged on the separating can. The Hall sensor detects a position of the motor rotor in the dry chamber. The Hall sensor comprises a sensor head and Hall sensor electric connecting lines. A positioning element comprises positioning element electric connecting lines which are connected with the corresponding Hall sensor electric connecting lines. The positioning element electric connecting lines comprise a connecting body comprising a connecting body form-fit structure. The connecting body is electrically insulating and holds the positioning element electric connecting lines. The separating can form-fit structure and the connecting body form-fit structure fix the connecting body on the separating can.

11 Claims, 6 Drawing Sheets

(51) Int. Cl.
*F04D 13/08* (2006.01)
*H02K 5/128* (2006.01)
*H02K 11/215* (2016.01)

(58) Field of Classification Search
USPC .................. 417/423.14; 310/12.19; 73/866.5
See application file for complete search history.

(56) References Cited

U.S. PATENT DOCUMENTS

| | | | |
|---|---|---|---|
| 2006/0169061 A1* | 8/2006 | Seffernick | H02K 29/08 73/862.331 |
| 2007/0252487 A1 | 11/2007 | Fujii et al. | |
| 2009/0309441 A1* | 12/2009 | Yang | H02K 29/08 310/91 |
| 2016/0065037 A1* | 3/2016 | Buerger | F04D 13/0606 310/52 |

FOREIGN PATENT DOCUMENTS

| | | | | |
|---|---|---|---|---|
| GB | 2 361 998 A | 11/2001 | | |
| JP | 11-82395 A | 3/1999 | | |
| JP | 2001-304180 A | 10/2001 | | |
| JP | 2005-73325 A | 3/2005 | | |
| JP | 2006-29253 A | 2/2006 | | |
| JP | 2007-97257 A | 4/2007 | | |
| JP | 2008-295222 A | 12/2008 | | |
| JP | 4760527 B2 * | 8/2011 | ............. | F04D 13/02 |
| WO | WO 2007/116956 A1 | 10/2007 | | |

\* cited by examiner

ELECTRICAL SPLIT-CAGE OR CANNED COOLANT PUMP

CROSS REFERENCE TO PRIOR APPLICATIONS

This application is a U.S. National Phase application under 35 U.S.C. § 371 of International Application No. PCT/EP2012/068219, filed on Sep. 17, 2012. The International Application was published in German on Mar. 20, 2014 as WO 2014/040651 A1 under PCT Article 21(2).

FIELD

The present invention relates to an electric split-case or canned coolant pump with an electric drive motor and a pump module.

BACKGROUND

Coolant pumps generally serve to convey a liquid cooling medium for the purpose of cooling an internal combustion engine, electronics, an accumulator, an intercooler, a turbo charger etc. The pump module is driven by the electric drive motor. The electric drive motor has a split case or a separating can that separates a wet chamber, holding the liquid coolant, from a dry chamber. A permanently excited motor rotor rotates in the wet chamber, which rotor is arranged on a rotor shaft. The wet chamber is separated by the separating can/split case from a dry chamber containing the electronically commutated motor stator. The motor stator is formed by a plurality of stator coils. A Hall sensor is provided in the dry chamber at the separating can to detect the rotary position of the motor rotor for the purpose of electronic commutation, the sensor being spaced from the motor rotor.

A very precise and reproducible positioning of the Hall sensor is essential for a high control quality since even small deviations in the Hall sensor position with respect to its desired position, as well as vibratory movements of the Hall sensor during operation may adversely affect electronic commutation.

CN 19 41 569 describes a canned pump which comprises a sensor receptacle on which magnetic field sensors are arranged to detect the position of the motor rotor. The sensor receptacle opening is here oriented parallel with the rotating shaft of the rotor.

JP 2001 30 41 80 describes a canned pump with four induction sensors for detecting the motor rotor position. The sensors are arranged in the region of the separating can.

SUMMARY

An aspect of the present invention is to provide an electric canned coolant pump that is structurally simple and which can be manufactured at low cost, wherein a Hall sensor for the detection of the motor rotor position can be positioned and dismantled in a particularly simple, fast and exact manner even at positions which are difficult to access.

In an embodiment, the present invention provides an electric canned coolant pump which includes an electric drive motor comprising a split case provided as a separating can. The split case is configured to separate a wet chamber, in which a fluid to be conveyed is provided, from a dry chamber. The separating can comprises a separating can form-fit structure. A pump module is configured to be driven by the electric drive motor. A motor rotor is configured to be permanently excited. The motor rotor is arranged in the wet chamber. A motor stator is configured to be electronically commutated. The motor stator is arranged in the dry chamber. A Hall sensor is arranged on the separating can. The Hall sensor is configured to detect a position of the motor rotor in the dry chamber. The Hall sensor comprises a sensor head and Hall sensor electric connecting lines which are configured to be rigid. A positioning element comprises positioning element electric connecting lines which are configured to be rigid. The positioning element electric connecting lines are connected with the corresponding Hall sensor electric connecting lines. The positioning element electric connecting lines comprise a connecting body comprising a connecting body form-fit structure. The connecting body is configured to be electrically insulating and to hold the positioning element electric connecting lines. The separating can form-fit structure and the connecting body form-fit structure are configured so as to fix the connecting body on the separating can in a defined position.

BRIEF DESCRIPTION OF THE DRAWINGS

The present invention is described in greater detail below on the basis of embodiments and of the drawings in which.

DETAILED DESCRIPTION

A canned pump, specifically an electric canned coolant pump, has an electric drive motor as well as a pump module. The pump module is driven by the electric drive motor. The electric drive motor comprises a split case, in particular a separating can. The separating can separates a wet chamber filled with a liquid coolant from a dry chamber that may be filled with ambient air. A rotating and permanently excited motor rotor is located in the wet chamber. An electrically commutated motor stator is situated in the dry chamber. A Hall sensor is provided on the dry-chamber side of the separating can that is formed by a sensor head and rigid connecting lines.

The Hall sensor mounted on the separating can serves to precisely detect the rotational position, the rotational speed and/or, if desired, the rotational direction of the motor, and to supply basic information to control the motor. In an embodiment, the signals of the Hall sensor can, for example, be detected by a measuring device and be supplied to a control device that correspondingly drives the stator coils via an electronic commutator.

In an embodiment of the present invention, a positioning element can, for example, be provided which has rigid electric connecting lines. The rigid electric connecting lines of the positioning element are connected with corresponding connecting lines of the Hall sensor, for example, by welding. The connecting lines of the positioning element are held by an electrically insulating connecting body. The outer side of the separating can and the connecting body are respectively provided with a form-fit structure by which the connecting body is fixed to the separating can at a defined position.

The form-fit structures on either side allow the realization of a high accuracy of reproduction with respect of the position of the Hall sensor on the separating can. The reproducible and exact positioning of the Hall sensor makes a precisely timed commutation possible. The precisely timed commutation results in high failure safety, lower power surcharges for a safe operation and, potentially, a lower power design for the drive motor.

In an embodiment of the present invention, the Hall sensor for the detection of the position of the motor rotor can, for example, be located radially between the motor stator and the separating can.

Since the stray field emanating from the commutation electronics is typically generated at the axial ends of the stator, arranging a Hall sensor radially between the motor stator and the motor rotor has the advantage that the useful signal is relatively high at the Hall sensor. A high precision and resolution of the measuring signal are thereby achieved.

In an embodiment of the present invention, the connecting lines of the positioning element leading to the Hall sensor can, for example, be formed by a so-called punched comb. The connecting lines in the form of a punched comb can be manufactured at low cost, are rigid, and have a large cross section for an undisturbed transmission of small signals.

The connecting body can, for example, be injection molded from a plastic material. The injection molded connecting body holds the connecting lines or the punched comb together and forms a positioning and locking fixation. Besides holding the connecting lines or the punched comb together, the plastic material also has an electrical insulation function. The plastic material prevents a flow of current between electrical conductors or possible conductive materials and further serves to mechanically fasten the same. A reliable positioning and a simple assembly are thus achieved in a simple manner.

After assembly, the connecting body is connected with the complementary form-fit structure of the separating can. This complementary form-fit structure of the separating can thus form a retaining device for the Hall sensor.

In an embodiment of the present invention, the separating can can, for example, be provided with radial guide webs to hold the connecting lines of the Hall sensor. The guide webs can, for example, be formed integrally with the separating can.

Besides a fixation of the connecting body, the radial guide webs also provide for a further fixation in the immediate vicinity of the sensor head of the Hall sensor. Guiding the connecting line of the Hall sensor improves the reproduction accuracy in positioning the sensor head of the Hall sensor. Movements of the sensor head caused by vibration, and signal pick-up disturbances caused thereby, are almost excluded.

In an embodiment of the present invention, the sensor head of the Hall sensor can, for example, be seated in a sensor pocket situated on the separating can. The sensor pocket is formed by at least two radial guide webs fixing the sensor head of the Hall sensor in the circumferential direction. This arrangement avoids displacements and vibrations of the sensor head and inaccuracies in commutation. The sensor pocket also functions to mechanically protect the sensor head of the Hall sensor.

The sensor pocket allows a higher reproduction position accuracy to be achieved. A more static and vibration tolerant fixation of the sensor head of the Hall sensor on the separating can also be realized.

In an embodiment of the present invention, the complementary form-fit structure and/or the sensor pocket and/or the guide webs can, for example, be formed integrally with the separating can of plastic material. The integrally formed profiles have a basic profile that is substantially bending resistant.

By providing for an integral design, greater forces can be absorbed and no connecting operating is required. The integral design further allows for a more economic manufacture.

In an embodiment of the present invention, the connecting body can, for example, be fixed to the complementary form-fit structure of the separating can in a form-fitting and/or a force-fitting manner and/or by bonding. All three connection categories provide for a tolerance-free fixation. A bonding and a force-fitting connection additionally provide the captivity of the positioning element or the connecting body.

In an embodiment of the present invention, the connecting lines of the punched comb can, for example, engage recesses in the separating can so as to make a form-fitting connection. Both a safe delimitation of the individual lines from each other and their fixation on the separating can is thereby realized in a single operation step so that a simple and economical assembly is possible.

In an embodiment of the present invention, a locking connection can, for example, be provided between the Hall sensor and the complementary form-fit structure which may again be disengaged once the Hall sensor is assembled to the complementary form-fit structure. This allows a dismantling of the Hall sensor, for example, in the event the Hall sensor fails. The locking connection at the separating can makes it possible to quickly and effectively fasten the positioning element to the separating can.

In an embodiment of the present invention, the form-fit connection between the Hall sensor and the separating can can, for example, be complemented by so-called thermal caulking, hot caulking, or gluing to the separating can. With this described connection, an exact, simple, robust, permanent, as well as a low-cost positioning of the Hall sensor for detecting the motor rotor position of the canned coolant pump is realized.

In an embodiment of the present invention, the canned motor in its entirety can, for example, be realized as an internal rotor motor so that the motor rotor is arranged inside the separating can and the motor stator sits on the outer side of the cylindrical separating can wall.

An embodiment of the present invention will be explained in more detail below under reference to the drawings.

Figure 1:
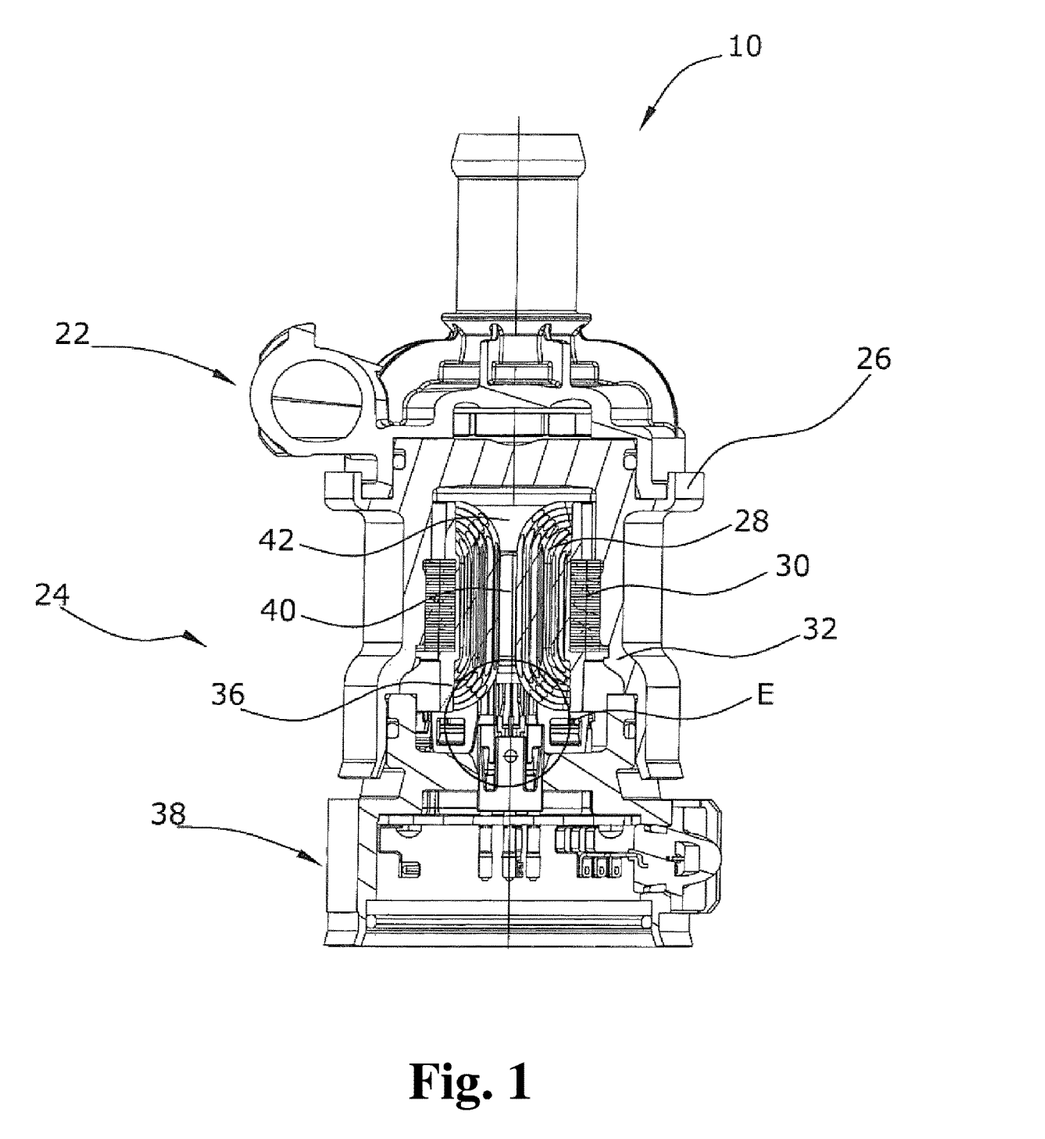
FIG. 1 shows a perspective longitudinal section of an electric canned coolant pump according to the present invention.

The electric canned coolant pump 10 illustrated in FIG. 1 serves to convey a liquid coolant in a coolant circuit for an internal combustion engine, an electric motor, electronics, a battery etc.

The electric canned coolant pump 10 comprises an electric drive motor 24 formed by a motor rotor 28 and a motor stator 30. The motor rotor 28 is arranged on the motor shaft 40 for rotation therewith. The motor rotor 28 is surrounded by stator coils of the annular motor stator 30. In a gap 31 between the motor rotor 28 and the motor stator 30, a separating can 36 is situated which, in a manner known per se, separates the wet chamber 42, which is located inside the separating can 36 and through which the conveyed coolant flows, from the dry (stator) chamber 32 located outside the separating can 36. The motor rotor 28 is in drive connection with a pump module 22 via the motor shaft 40. The motor rotor 28 rotates as a wet rotor in the coolant inside the separating can 36.

At the end of the separating can 36 averted from the pump module, a Hall sensor 64 for detecting the position of the motor rotor 28 is located in the area identified by detail E. The Hall sensor 64 is fastened to the separating can 36.

FIGS. 2 to 6 show the detail E indicated in FIG. 1 in two different embodiments.

Figure 2:
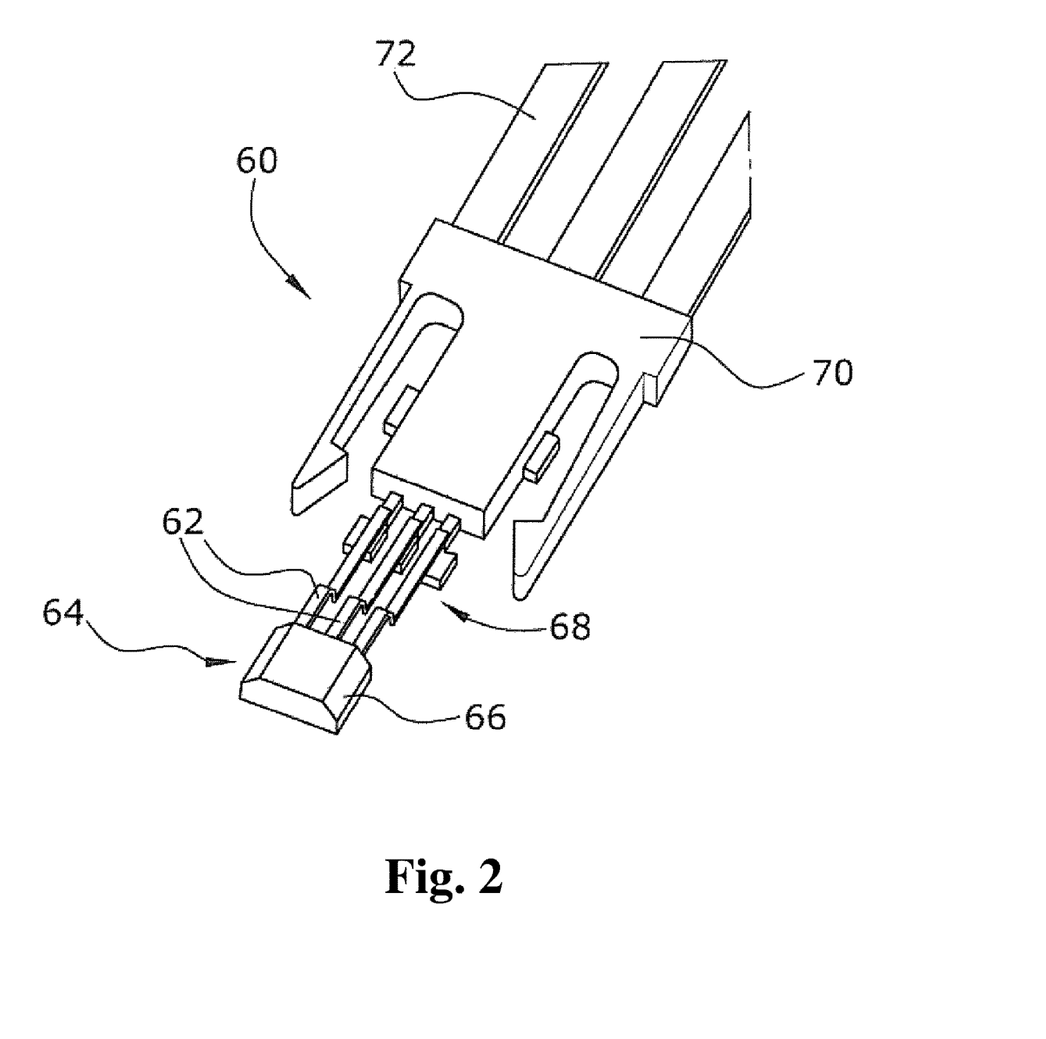
FIG. 2 shows a positioning element together with the Hall sensor mounted thereto.

FIG. 2 illustrates the positioning element 60 which is connected to the Hall sensor 64. The fastening of the positioning element 60 in the separating can-side form-fit structure 78 is realized by means of an injection molded plastic connecting body 70. Starting from the connecting body 70, rigid connecting lines 62 extend to the Hall sensor 64. The connecting lines 62 are formed by a punched comb 68. The Hall sensor 64 comprises a sensor head 66. Via its rigid connecting lines 62, the sensor head 66 of the Hall sensor 64 is electrically connected with the punched comb connection lines 68 and is mechanically connected with the connecting body 70. The rigid connecting lines 62 between the Hall sensor 64 and the connecting body 70 bridge the distance between the sensor head 66 and the connecting body 70.

Figure 3:
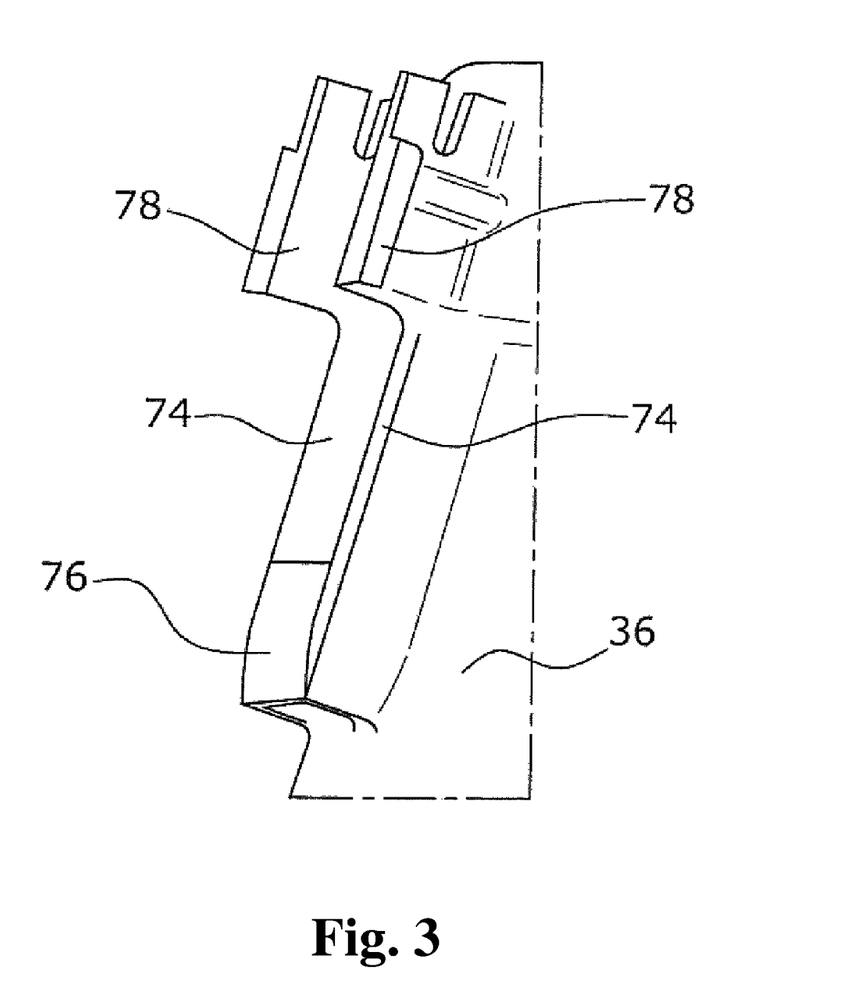
FIG. 3 shows an embodiment of the separating can-side form-fit structure.

FIG. 3 illustrates a first embodiment of the separating can-side form-fit structure 78. This separating can-side form-fit structure 78 shows radially protruding and axially extending guide webs 74 into which the connecting body 70 of the positioning element 60 lockingly engages via a locking connection. The guide webs 74 can, for example, be formed integrally with the separating can, e.g., molded from a plastic material. Besides the contour for the insertion of the connecting body 70 of the positioning element 60, the separating can-side form-fit structure 78 has a protective plastic material sensor pocket 76 for insertion of the sensor head 66 of the mounted Hall sensor 64. The sensor pocket 76 on the separating can 36 is formed and positioned so that the Hall sensor 64 is arranged radially between the motor stator 30 and the motor rotor 28 and as close as possible to the rotor. In this position, the rotary speed and/or the angular speed of the motor rotor 28 can be detected precisely by means of the Hall sensor 64.

Figure 4:
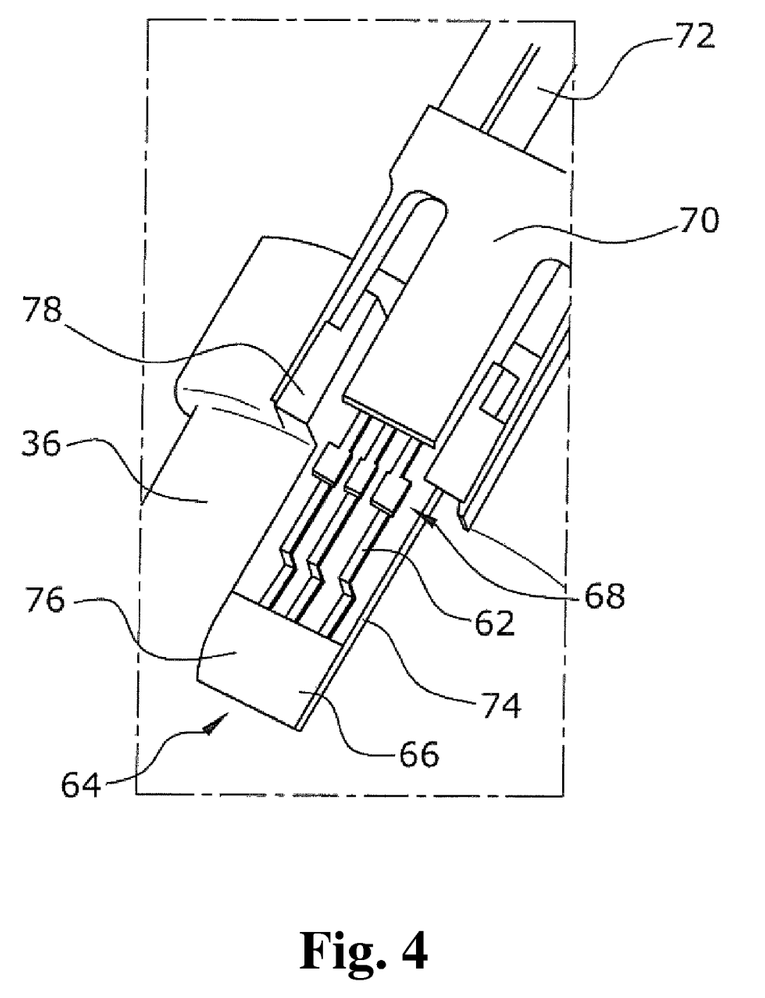
FIG. 4 shows the assembly of the positioning element and an embodiment of the separating can-side form-fit structure.

The assembly illustrated in FIG. 4 provides for a safe, exact, simple to assemble and releasable connection, whereby a reproducible positioning of the Hall sensor 64 is provided. The rigid connecting lines 62 of the Hall sensor 64, as well as the connecting body 70 of the positioning element 60 engage into the guide webs 74 provided on the separating can 36, so that a low-vibration and positionally accurate fastening of the Hall sensor 64 and in particular of the sensor head 66 on the separating can 36 is provided.

Figure 5:
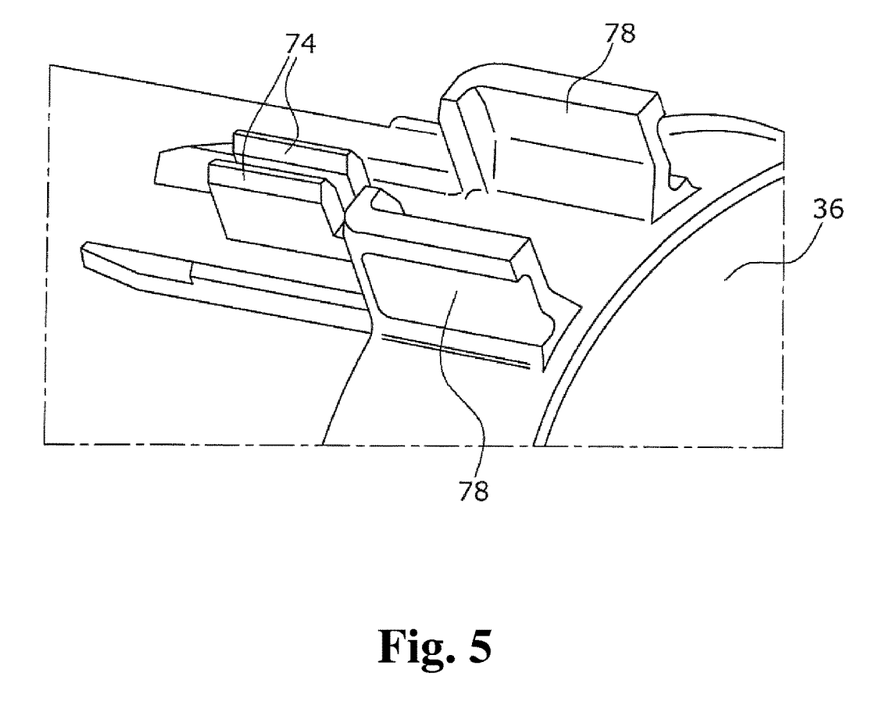
FIG. 5 shows an embodiment of the separating can-side form-fit structure.

FIG. 5 shows a second embodiment of the separating can-side form-fit structure 78. This separating can-side form-fit structure 78 also has radially protruding and axially extending connecting line guide webs 74 into which the connecting body 70 of the positioning element 60 is introduced and fixed by means of a locking connection. The two connecting line guide webs 74 are arranged between the three punched comb connecting lines 68. In contrast to the first embodiment, the separating can-side form-fit structure 78 of the second embodiment has no sensor pocket 76.

Figure 6:
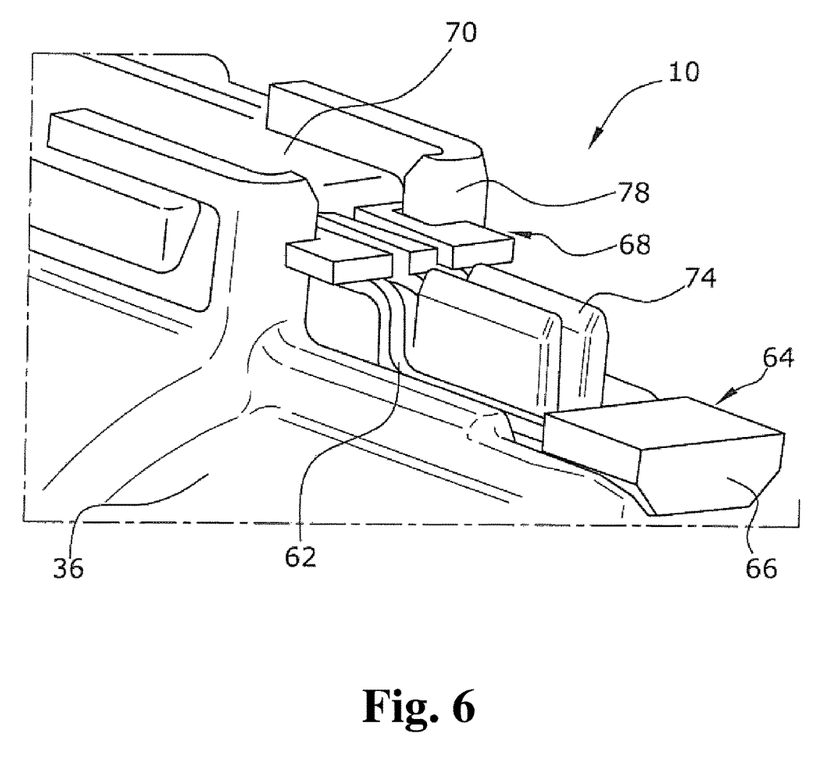
FIG. 6 shows the assembly of the positioning element and the second embodiment of the separating can-side form-fit structure.

FIG. 6 shows the assembly of the positioning element 60 on the separating can 36. By means of the two connecting line guide webs 74, a safe electrical separation of the punched comb connecting lines 68 is realized, in particular in the event of vibrations. The sensor head 66 is also fixed close to the sensor head and in a largely vibration tolerant manner. A fixation by means of thermal forming of the guide webs 74 can also be performed after the sensor has been mounted.

The present invention is not limited to embodiments described herein; reference should be had to the appended claims.

LIST OF REFERENCE NUMERALS 10 electric canned coolant pump
22 pump impeller/pump module
24 electric drive motor
26 motor housing
28 motor rotor
30 motor stator
31 gap
32 dry chamber
36 separating can/split case
38 electronics
40 motor shaft
42 wet chamber
60 positioning element
62 connecting lines (of the Hall sensor)
64 Hall sensor
66 sensor head
68 punched comb
70 connecting body
72 connecting lines
74 guide webs
76 sensor pocket
78 form-fit structure
E detail

What is claimed is:

1. An electric canned coolant pump comprising:
an electric drive motor comprising a split case provided as a separating can, the split case being configured to separate a wet chamber, in which a fluid to be conveyed is provided, from a dry chamber, the separating can comprising a separating can form-fit structure;
a pump module configured to be driven by the electric drive motor;
a motor rotor configured to be permanently excited, the motor rotor being arranged in the wet chamber;
a motor stator configured to be electronically commutated, the motor stator being arranged in the dry chamber;
a Hall sensor arranged on the separating can, the Hall sensor being configured to detect a position of the motor rotor in the dry chamber, the Hall sensor comprising a sensor head and Hall sensor electric connecting lines which are configured to be rigid; and
a positioning element comprising positioning element electric connecting lines which are configured to be rigid, the positioning element electric connecting lines being connected with the corresponding Hall sensor electric connecting lines, the positioning element electric connecting lines comprising a connecting body comprising a connecting body form-fit structure, the connecting body being configured to be electrically insulating and to hold the positioning element electric connecting lines,
wherein, the separating can form-fit structure and the connecting body form-fit structure are configured so as to directly fix the connecting body on the separating can in a defined position.

2. The electric canned coolant pump as recited in claim 1, wherein the Hall sensor is arranged radially between the motor stator and the separating can.

3. The electric canned coolant pump as recited in claim 1, further comprising a punched comb, wherein the positioning element electric connecting lines leading to the Hall sensor are formed by the punched comb.

4. The electric canned coolant pump as recited in claim 1, wherein the connecting body is provided as a plastic material body.

5. The electric canned coolant pump as recited in claim 1, wherein the separating can comprises radial guide webs, the radial guide webs being configured to hold the Hall sensor connecting lines.

6. The electric canned coolant pump as recited in claim 5, wherein the separating can further comprises a separate sensor pocket, the sensor head being arranged in the separate sensor pocket.

7. The electric canned coolant pump as recited in claim 6, wherein at least one of the separating can form-fit structure, the separate sensor pocket, and the radial guide webs are formed integrally with the separating can.

8. The electric canned coolant pump as recited in claim 1, wherein the connecting body is fixed to the separating can form-fit structure in at least one of a form-fitting manner, a force-fitting manner, and via a bonding.

9. The electric canned coolant pump as recited in claim 1, wherein the connecting body form-fit structure is configured to form a detachable locking connection with the separating can form-fit structure.

10. The electric canned coolant pump as recited in claim 1, wherein the connecting body form-fit structure is secured with the separating can form-fit structure via a thermal caulking or a glue.

11. The electric canned coolant pump as recited in claim 1, wherein the motor rotor is provided as an internal rotor and the motor stator is provided as an external stator.

* * * * *